(12) United States Patent
Michel et al.

(10) Patent No.: US 11,707,924 B2
(45) Date of Patent: Jul. 25, 2023

(54) MULTILAYER FILM WITH INCREASED SURFACE ROUGHNESS AND METHOD OF MAKING THE SAME

(71) Applicant: TAGHLEEF INDUSTRIES INC., Newark, DE (US)

(72) Inventors: Christoph Michel, Terre Haute, IN (US); Javier Del Barrio Perez, Alcala la Real (ES)

(73) Assignee: TAGHLEEF INDUSTRIES INC., Newark, DE (US)

( * ) Notice: Subject to any disclaimer, the term of this patent is extended or adjusted under 35 U.S.C. 154(b) by 0 days.

(21) Appl. No.: 17/678,578

(22) Filed: Feb. 23, 2022

(65) Prior Publication Data
US 2022/0266579 A1    Aug. 25, 2022

Related U.S. Application Data

(60) Provisional application No. 63/152,415, filed on Feb. 23, 2021.

(51) Int. Cl.
*B32B 27/20* (2006.01)
*B32B 27/08* (2006.01)
*B32B 27/32* (2006.01)

(52) U.S. Cl.
CPC .............. *B32B 27/20* (2013.01); *B32B 27/08* (2013.01); *B32B 27/205* (2013.01); *B32B 27/32* (2013.01); *B32B 2255/26* (2013.01); *B32B 2264/202* (2020.08); *B32B 2264/303* (2020.08); *B32B 2264/305* (2020.08); *B32B 2270/00* (2013.01);
(Continued)

(58) Field of Classification Search
CPC .......... B32B 2250/242; B32B 2255/26; B32B 2264/02; B32B 2264/0235; B32B 2264/025; B32B 2264/0285; B32B 2264/10; B32B 2264/1021; B32B 2264/1022; B32B 2264/202; B32B 2264/303; B32B 2264/305; B32B 2270/00; B32B 2307/4023; B32B 2307/412; B32B 2307/50; B32B 2307/538; B32B 2307/732; B32B 2307/75; B32B 2519/00;
(Continued)

(56) References Cited

U.S. PATENT DOCUMENTS 5,151,317 A  *  9/1992  Bothe .................... B32B 27/32
                                                  428/447
5,254,302 A     10/1993  Yamanaka
(Continued)

FOREIGN PATENT DOCUMENTS

| CN | 108656688 A | 10/2018 | |
| EP | 2181843 A1 | 5/2010 | |
| EP | 2181843 A1 * | 5/2010 | ............. B32B 27/16 |

OTHER PUBLICATIONS

Extended European Search Report from corresponding EP 22158354.5 dated Jun. 24, 2022.
English-language abstract for CN 108656688 A (2018).

*Primary Examiner* — Hai Vo
(74) *Attorney, Agent, or Firm* — Caesar Rivise, PC

(57) ABSTRACT

The present invention relates to a multilayer film including at least one film surface which has an increased surface roughness achieved by protrusion creating particles. The at least one film surface may have a surface roughness characterized by a coefficient of roughness (CR) of ≥0.02 or a Parker Print Surf roughness of at least 2 μm.

24 Claims, 5 Drawing Sheets

(52) U.S. Cl.
CPC ............... *B32B 2307/4023* (2013.01); *B32B 2307/538* (2013.01); *B32B 2307/732* (2013.01); *B32B 2307/75* (2013.01)

(58) Field of Classification Search
CPC ......... B32B 27/08; B32B 27/18; B32B 27/20; B32B 27/205; B32B 27/32
See application file for complete search history.

(56) References Cited

U.S. PATENT DOCUMENTS

| | | | |
|---|---|---|---|
| 5,512,649 A * | 4/1996 | Hendrickson-Benkhoff | ............... C08K 7/00 428/338 |
| 5,683,802 A * | 11/1997 | Murschall | ............... B32B 27/32 428/407 |
| 6,620,473 B2 | 9/2003 | Nishizawa et al. | |
| 6,858,283 B2 | 2/2005 | Nishizawa et al. | |
| 2011/0254909 A1* | 10/2011 | Lu | ............... B41M 5/52 428/32.38 |
| 2013/0212983 A1* | 8/2013 | Bender | ............... B32B 3/00 156/244.11 |
| 2016/0046101 A1 | 2/2016 | Ueda et al. | |
| 2017/0087814 A1* | 3/2017 | Goel | ............... B32B 37/02 |
| 2019/0299579 A1* | 10/2019 | Dou | ............... B32B 27/20 |

* cited by examiner 36   38   34   40   32

MULTILAYER FILM WITH INCREASED SURFACE ROUGHNESS AND METHOD OF MAKING THE SAME

CROSS-REFERENCE TO RELATED APPLICATIONS

This non-provisional utility application claims the benefit under 35 U.S.C. § 119(e) of U.S. Provisional Patent Application Ser. No. 63/152,415 filed on Feb. 23, 2021 and entitled MULTILAYER FILM WITH INCREASED SURFACE ROUGHNESS AND METHOD OF MAKING THE SAME, the entire disclosure of which is incorporated by reference herein.

BACKGROUND OF THE INVENTION

The present invention relates to a multilayer film comprising at least one film surface which has an increased roughness achieved by protrusion creating particles. The multilayer film comprises at least a core or base layer, an inner skin layer, and a printable outer layer. The multilayer film of this invention can be used for many different applications, for example in a process of producing label-laminated containers by in-mold labelling, particularly in the food and biomedical fields.

Besides surface chemistry, roughness defines how the surface interacts with other substances in contact with the surface. For instance, the beading and roll off of water on a lotus leaf is caused by microscale surface roughness generating superhydrophobic characteristics, which is the underlying mechanism of the lotus leaf's self-cleaning effect. This technology can be leveraged to keep solar panels, windows, and appliances clean. Superhydrophobicity can also reduce hydrodynamic drag when applied to a boat hull or on a microfluidic diagnostic test surface.

With a different roughness design and scaling, liquids can bead on the surface and yet strongly attach. This principle is realized in nature on rose petals and can be used to impact cell and tissue growth.

On the other hand, surface roughness can also lead to superhydrophilic surface characteristics where water or liquids of similar polarity exhibit little contact angle which in turn can be used to create antifog surfaces where water forms a thin film instead of optically interfering droplets. Controlled micro roughness drives surface wicking that can be used to promote chromatographic separation for biological testing. Control of the surface roughness on the microscale also enables improved options for water oil separation which is important in food processing, chemical processing, and energy.

Finally, a surface that has appropriate scales of roughness can also act as a strong attachment site for adhesives, glues, coatings, and inks. Having an economical approach to tailored micro rough surfaces of films as described in this patent can be used to improve performance in many surface sensitive applications, for instance better ink receptive for printing, or less adhesion to itself (blocking).

The present invention provides a technique to achieve an extraordinarily high surface roughness for plastic films which is beneficial in many film applications, for example, in-mold labelling in blow molding where the increased surface roughness helps to avoid labelling defects like blister formation.

Blow molding is a technique employed to produce plastic containers of various sizes and shapes to store and sell consumer products of different kinds. In order to display content, brand and consumer information, these containers must be appropriately labelled.

There are several ways of labeling a hollow plastic container, including: (1) heat-shrinking a plastic sleeve around the container, (2) adhering a paper or plastic film label with a pressure sensitive adhesive, which includes wrap-around labels, or (3) fusing a plastic film with the container during the actual blow molding process when the container is shaped (i.e., in-mold labeling).

In-mold labeling applies the label to a container during container production in a single step, and therefore is more cost effective than other methods in which the label is applied as a separate step after container formation. Moreover, in-mold labeling firmly incorporates the label with a molded container, thereby enhancing the durability of the labeled product.

In the in-mold label process, a label is taken from a label stack by, e.g., a vacuum transfer system and inserted in the mold with the printed side facing the inside wall of the mold. At this stage, the label is held in place by another vacuum system associated with the mold. The mold is closed after the parison (molding blank) is extruded inside the mold. In the final stage of the process, pressure is applied to the inside of the parison to expand the parison into conformity with the shape of the mold to form the labelled product. After a short cooling period the mold is opened to release the labeled product.

One of the major problems encountered in an in-mold labeling process is the formation of blisters in the label. This can result from the inclusion of gas pockets between the label and container wall.

Conventional in-mold labeling techniques require the use of an embossing and/or perforation step of the label to avoid blistering. For example, U.S. Pat. No. 5,254,302 discloses an in-mold label with a pattern of indentations minimizes or eliminates the development of blisters in the in-mold label. The '302 patent discloses that this pattern provides a sufficient open volume to retain the entrapped gas therein and prevent entrapped gas from accumulating and creating gas pockets in other areas of the label, or escaping at the edges of the label; however this method requires embossing the film with a pattern of indentations having from 60 to 200 lines per inch embossed onto the side that fuses with the container wall.

U.S. Pat. No. 6,858,283 discloses a label for in-mold labeling, having a heat-sealable layer with an average surface roughness Ra of 0.5 to 5 μm and having an air permeability of 10 to 20,000 sec (based on JIS-P-8117). However, this surface roughness is achieved by embossing the label film and providing air permeability with perforations (holes/slits) in the label. The '283 patent states that the combination of surface roughness and perforation inhibits blistering.

U.S. Pat. No. 6,620,473 discloses a label for in-mold labeling having a heat-sealable layer including a heat-sealable resin, a fatty acid amide with a molecular weight of at least 300 and an organic or inorganic fine powder having an average particle size larger than the thickness of the heat-sealable layer. It is taught that this composition facilitates label separation from a stack by improving parting or sliding properties, especially upon printed film surfaces. However, the '473 patent sets forth that the embossments prevent the generation of blisters.

US 20160046101 discloses an in-mold label having a heat-sealing layer consisting of a thermoplastic resin and being characterized in that the layer includes at least one crystallization peak that occurs between 85 and 110° C. (by DSC) and has a hot tack force at 130° C. of 120 to 350 gf/cm². The '101 patent states that the heat-sealing layer reduces defects like blisters in a labeled container if the process cycle time is short; however, the '101 publication requires embossing of the heat-sealing layer to further reduce blisters.

Conventional means for avoiding blister formation are exemplified in U.S. Pat. No. 5,254,302, which discloses an embossed reverse gravure pattern comprising 60 to 200 dots or lines per inch. Such an embossed pattern "prevents the occurrence of blistering because it possesses spaces of a volume sufficient to trap the air or gas resulting from the blow molding." (U.S. Pat. No. 5,254,302, page 5 line 20-23). The embossment is accomplished through inter-stretch extrusion coating in combination with a gravure roller. (See FIGS. 1-4, herein).

Some film applications require an extraordinary, macroscopic rough surface which cannot be achieved with common production methods. The present invention advantageously gives access to an alternative solution that can be produced on commonly used equipment in PP film industry. Conventional methods require a specific rather uncommon extrusion setup (including, for example, inter-stretch extrusion & embossing roller) that is not widely applied. Accordingly, the solution as disclosed herein is easier and more broadly applicable, and is therefore less expensive, and technically less complex.

All references cited herein are incorporated herein by reference in their entireties.

BRIEF SUMMARY OF THE INVENTION

The present invention provides a technique to achieve a high surface roughness for plastic films which are beneficial in many film applications, for example, in-mold labeling, where the increased surface roughness helps to prevent labeling defects such as blisters.

In one embodiment, the invention contains at least 3 layers with the particle containing layer being the inner skin layer. The inner skin layer is the exposed surface layer to be positioned contiguous to the parison for attachment to the molded product.

In another embodiment the inner skin layer is a coated layer that is applied as a melt, a solution, or preferably a dispersion of a binding resin and protrusion creating particles. Such coatings may be applied onto the inner surface of a coextruded oriented multilayer film in a separate step after film formation, or in-line with the extrusion and orientation process, for example, between the machine direction orientation ("MDO") and transverse direction orientation ("TDO") steps.

As disclosed herein, free space of sufficient volume is achieved by high amounts of particles of sufficient mean particle size. As disclosed herein, the particles provide numerous protrusions on the film surface. This creates large "channels" between- and free volume around—the particles; the channels promote air flow between the parison and the label, the free volume facilitates stowing away eventually entrapped air locally rather than in major blisters.

Preferably the particles are compact (as opposed to platelet-like), and most preferably essentially spherical.

In certain embodiments, the particles are located in the intermediate layer with a protective sealable layer as the adjacent inner skin layer. This arrangement encloses the particles and provides a better anchorage and resistance against any kind of abrasion, such as abrasion between rollers and film surface in any conversion process, as well as abrasion between film to film when sheets/labels are stacked. Abrasion and particle loss may affect the functionality of the film with regard to avoiding blisters. Additionally, covering the top of the particles with sealable material maximizes the sealable area in comparison to a non-covered modification where the particles are/may be exposed.

In other embodiments, the protrusion creating particles can be applied as part of a water or solvent-based coating, or extrusion coating, provided that the coating matrix material provides sufficient adhesion to the container material. In another embodiment, such a coating can be applied between MDO and TDO steps The disclosure provides a multilayer film having an inner film face and an outer film face, the film comprising: an inner skin layer, optionally wherein said inner skin layer comprises protrusion creating particles; a core layer having a thickness which is the majority of the thickness of the multilayer film structure, further wherein said core layer is optionally voided; an outer skin layer which is optionally a printable layer; optionally, an inner intermediate layer is interposed between the inner skin layer and the core layer, optionally wherein said inner intermediate layer comprises protrusion creating particles; wherein said inner film face has a surface roughness characterized by a coefficient of roughness (CR) of ≥0.02 or a Parker Print Surf roughness of at least 2 μm. The disclosure provides a multilayer film wherein the inner film face has a surface roughness characterized by a coefficient of roughness (CR) of about 0.05 to about 0.5. The disclosure provides a multilayer film wherein the inner film face has a surface roughness characterized by a CR of about 0.10 to about 0.3. The disclosure provides a multilayer film wherein the inner film face has a surface roughness characterized by a CR of about 0.15 to about 0.2. The disclosure provides a multilayer film wherein the inner film face has a surface roughness characterized by a Parker Print Surf roughness of at least about 2 μm to at least about 12 μm. The disclosure provides a multilayer film wherein the inner film face has a surface roughness characterized by a Parker Print Surf roughness of at least about 5 μm to at least about 11 μm. The disclosure provides a multilayer film wherein the inner film face has a surface roughness characterized by a Parker Print Surf roughness of at least about 8 μm to at least about 10 μm. The disclosure provides a multilayer film wherein said protrusion creating particles have a size of from about 8 micrometers to about 60 micrometers. The disclosure provides a multilayer film wherein said protrusion creating particles have a narrow particle size distribution expressed by coefficient of variation from average particle size of ±50%. The disclosure provides a multilayer film wherein said protrusion creating particles have a narrow particle size distribution expressed by coefficient of variation from average particle size of ±30%. The disclosure provides a multilayer film wherein said protrusion creating particles are selected from the group consisting of Poly(Methyl Methacrylate) (PMMA), Polymethylsilsesquioxane, Silica, Polystyrene, Polybutylene terephthalate, $CaCO_3$, $TiO_2$, Talc, Mica, Vermiculite and combinations thereof. The disclosure provides a multilayer film wherein the protrusion creating particle layer has a thickness of up to 50% of the average particle diameter. The disclosure provides a multilayer film wherein said protrusion creating particles are essentially spherical. The disclosure provides a multilayer film wherein the protrusion creating particle layer has a coating applied by a process selected from the group consisting of Coextrusion, Extrusion coating, and water/solvent based coating. The disclosure provides a multilayer film wherein the coating of the protrusion creating particle layer enhances particle anchorage. The disclosure provides a multilayer film wherein the inner skin is the inner film face. The disclosure provides a multilayer film wherein the inner skin layer comprises protrusion creating particles. The disclosure provides a multilayer film wherein the inner skin layer comprising protrusion creating particles is coated. The disclosure provides a multilayer film wherein the inner skin layer has a protective sealant layer applied by a method selected from the group consisting of coextrusion, extrusion coating, and water/solvent based coating. The disclosure provides a multilayer film wherein the inner skin layer has a protective sealant layer optionally comprising organic or inorganic antiblock particles, migratory or non-migratory slip and/or antistat additives, organic or inorganic filler and/or pigments; wherein the thickness of said protective sealant layer layer is 0.5 to 4 µm. The disclosure provides a multilayer film wherein the inner skin layer has a protective sealant layer optionally comprising organic or inorganic antiblock particles, migratory or non-migratory slip and/or antistat additives, organic or inorganic filler and/or pigments; wherein the thickness of said protective sealant layer layer is 1 to 3 µm. The disclosure provides a multilayer film wherein the inner skin layer has a protective sealant layer wherein the protective sealant layer comprises a polymer selected to seal with polypropylene or polyethylene. The disclosure provides a multilayer film wherein the core layer comprises a polypropylene homopolymer, optionally wherein the polypropylene homopolymer is blended with a polypropylene based co- or terpolymer, C5 or C9 hydrocarbon resins, and optionally a voiding agent. The disclosure provides a multilayer film wherein the core layer comprises a voiding agent selected from the group consisting of calcium carbonate and polybutylene terephthalate. The disclosure provides a multilayer film wherein the inner intermediate layer is present and comprises protrusion creating particles. The disclosure provides a multilayer film wherein said inner intermediate layer has a protective sealable layer. The disclosure provides a multilayer film wherein the inner intermediate layer comprising protrusion creating particles is coated. The disclosure provides a multilayer film wherein the coating of the inner intermediate layer containing protrusion creating particles is applied by a process selected from the group consisting of Coextrusion, Extrusion coating, and water/solvent based coating. The disclosure provides a multilayer film wherein said inner intermediate layer has a sealant layer with carrier resin for the embedded particles, wherein the carrier resin is selected from the group consisting of propylene copolymer, a blend of propylene copolymer with propylene homopolymer, propylene homopolymer, ethylene homopolymer, and combinations thereof. The disclosure provides a multilayer film comprising an outer intermediate layer which is interposed between said core layer and said outer skin layer, wherein said outer intermediate layer improves bonding between the core layer and said outer skin layer. The disclosure provides a multilayer film is a laminate outer and inner member are laminated against each other using a water or solvent based adhesive or by extrusion lamination. The disclosure provides a multilayer film wherein the outer skin layer is transparent. The disclosure provides a multilayer film wherein the outer skin layer is a transparent BoPP layer. The disclosure provides a multilayer film wherein printed indicia are applied between the transparent outer and the inner member. The disclosure provides a multilayer film wherein printed indicia are applied in direct print on the outer surface of the inner member. The disclosure provides a multilayer film wherein printed indicia are applied between the transparent outer and the inner member in revers print on the inner surface of the outer member. The disclosure provides a multilayer film wherein printed indicia are applied to the outer surface of the outer skin layer. The disclosure provides a multilayer film wherein the outer skin layer comprises a printable layer, wherein the printable layer comprises ethylene, or propylene homopolymer, co- or terpolymer or blends thereof, organic or inorganic antiblock particles, migratory or non-migratory slip and/or antistat additives, organic or inorganic filler and/or pigments, and further wherein the thickness of the layer is 0.5 to 4.5 µm. The disclosure provides a multilayer film wherein the outer skin layer comprises a printable layer, wherein the printable layer comprises ethylene, or propylene homopolymer, co- or terpolymer or blends thereof, organic or inorganic antiblock particles, migratory or non-migratory slip and/or antistat additives, organic or inorganic filler and/or pigments, wherein the thickness of the layer is 1 to 3.5 µm. The disclosure provides a multilayer film wherein the outer skin layer defines or contributes to surface related characteristics such as coefficient of friction, sealability, printability, adhesion, readiness to fusion with the container material. The disclosure provides a multilayer film wherein the outer skin layer comprises printability enhancing coatings applied in one or more layers and may comprises resins from a group comprising polyethylene imine, polyurethanes, acrylics, and combinations thereof. The disclosure provides a multilayer film wherein the outer skin layer comprises printability enhancing coatings in a thickness of 0.15 to 4 µm each. The disclosure provides a multilayer film wherein the outer skin layer comprises printability enhancing coatings in a thickness of 0.2 to 2 µm each. The disclosure provides a multilayer film wherein the film thickness is between 15-160 µm. The disclosure provides a multilayer film wherein the film thickness is between 30-130 µm. The disclosure provides a multilayer film wherein the film thickness is between 45-110 µm. The disclosure provides a multilayer film wherein the particle containing layer is the inner skin layer. The disclosure provides a multilayer film wherein the multilayer film comprises three layers. The disclosure provides a multilayer film wherein the multilayer film comprises four layers. The disclosure provides a multilayer film wherein the multilayer film comprises five layers. The disclosure provides a multilayer film wherein the multilayer film comprises six layers. The disclosure provides a multilayer film used as a label in In-mold labelling. The disclosure provides a multilayer film used as a label in In-mold labelling and providing label bond strength to the container of at least about 200 g/inch. The disclosure provides a multilayer film used as a label in In-mold labelling and providing label bond strength to the container of at least about 500 g/inch. The disclosure provides a multilayer film used as a label in In-mold labelling and providing label bond strength to the container of at least about 1000 g/inch. The disclosure provides a method of producing the multilayer film as disclosed herein.

DETAILED DESCRIPTION OF THE INVENTION

Figure 1:
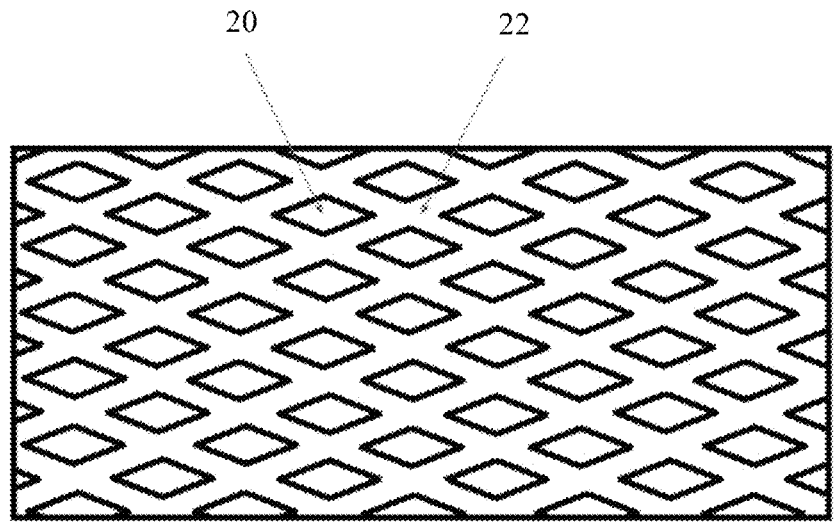
FIG. 1 is a drawing view of embossed cells in a heat sealable layer of the prior art.
Figure 2:
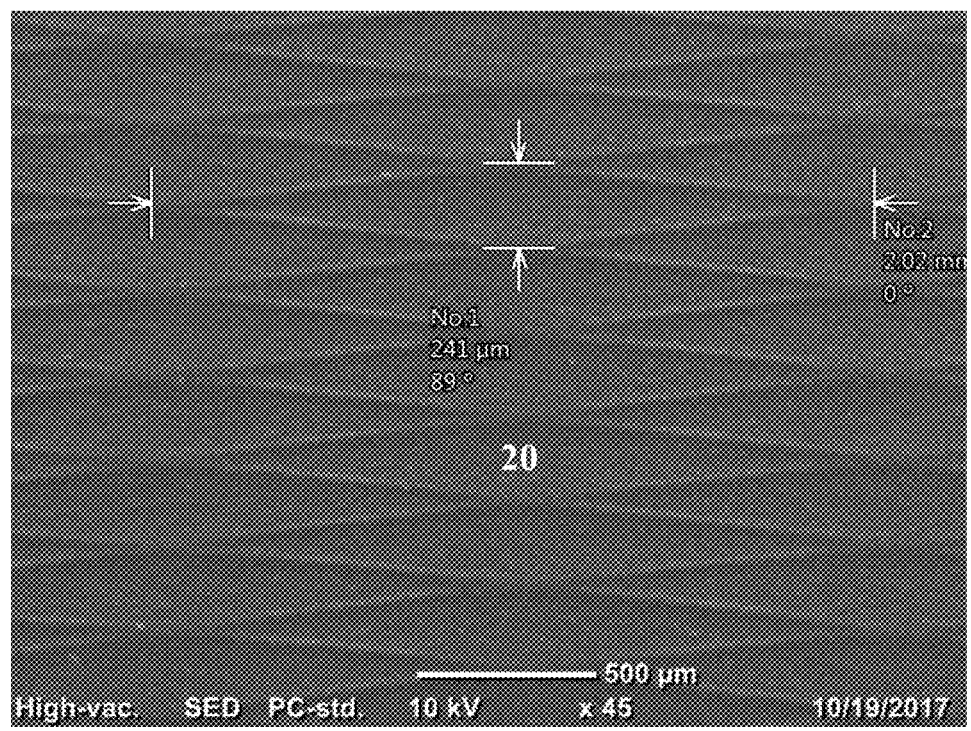
FIG. 2 is a scanning electron micrograph (SEM) of prior art embossed cells.
Figure 3:
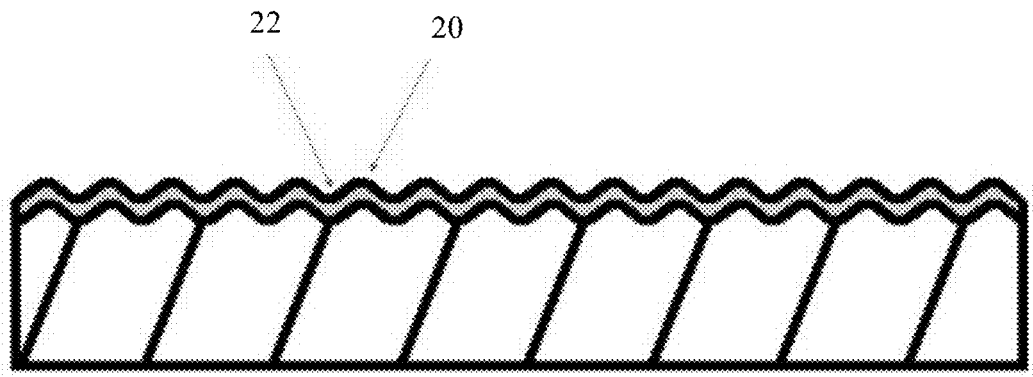
FIG. 3 is a side view drawing of a prior art embossed surface.
Figure 4:
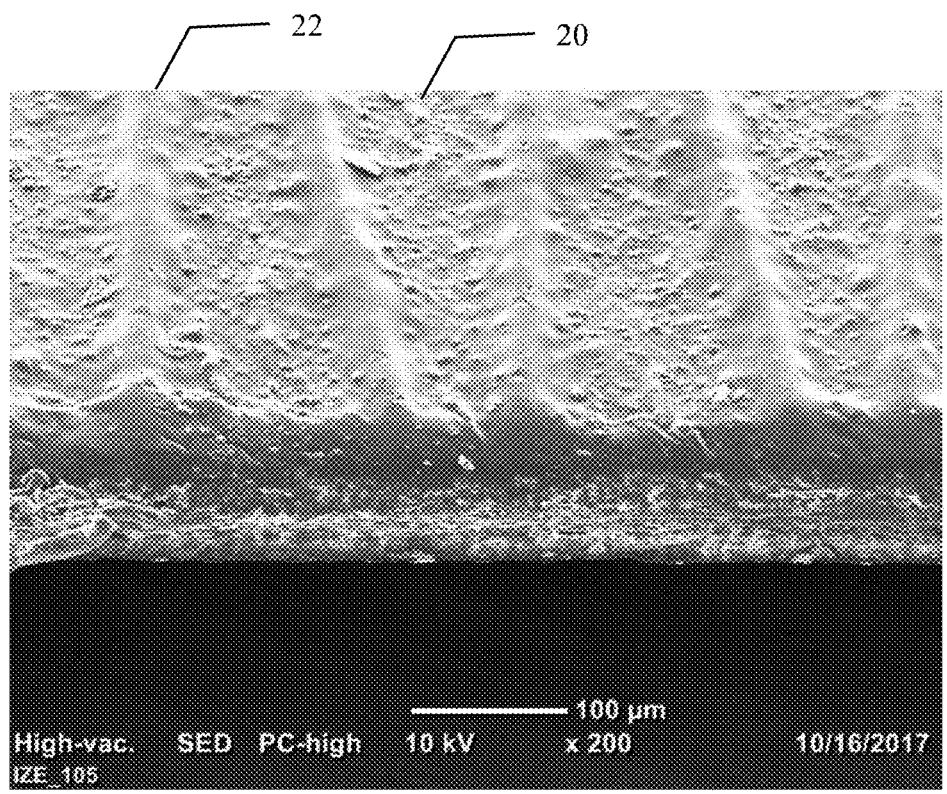
FIG. 4 is a 3D SEM view of a prior art embossed surface.
Figure 5:
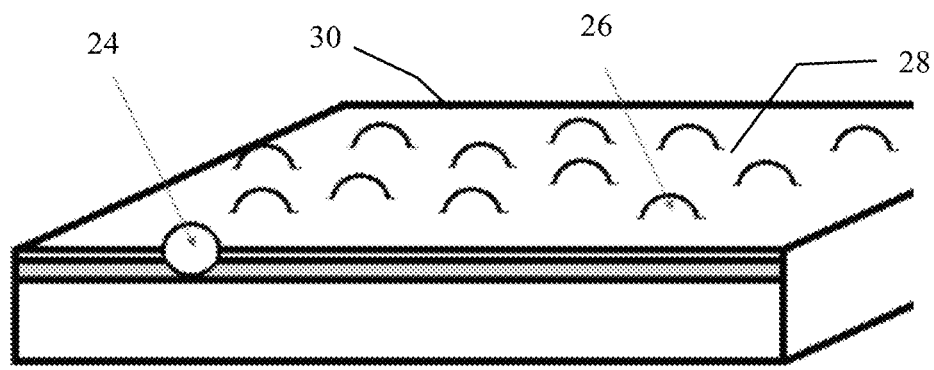
FIG. 5 is a 3D drawing of an embodiment of a film of the invention.

The present invention is directed to a multilayer coextruded biaxially oriented polypropylene film, and a major advantage of the present invention over conventionally available solutions is that the present film can be produced on common, unmodified BoPP Tenter lines and does not require specific modifications like inter-stretch extrusion coating or an embossing roller having a surface to impose a specific surface morphology onto the film.

The basic exemplary embodiment contains, for example, at least 3 layers with the particle containing layer being the inner skin layer:

| Protective/sealant inner skin | Sealable PP-Copolymer equipped with protrusion creating particles | 0.5-4 μm |
|---|---|---|
| Core layer | Core layer-voided or non-voided | |
| Printable outer skin | Printable propylene co- or terpolymer or their blends or blends with homo-PP or PE | 0.5-4.5 μm |

In one exemplary embodiment, the film comprises between 3 to 6 layers characterized in that at least one film surface comes with an increased roughness achieved by protrusion creating particles located in either the inner layer or the layer underneath.

In certain embodiments, the particle containing layer can be applied by, for example, coextrusion, extrusion coating, or water/solvent based coating.

A preferred embodiment comprises, for example, at least 4 layers, whereas one intermediate layer (layer between core and sealant layer) on at least one side, the inner side, is required:

| Protective/sealant inner skin | Sealant (preferred PE/PP sealant) | 0.5-4 μm |
|---|---|---|
| Inner intermediate layer | PP-Copolymer (C2-content ≥ 2%) equipped with protrusion creating particles as described in Examples in Table 1 | 1.5-10 μm |
| Core layer | Core layer-voided or non-voided | |
| Printable outer skin | Printable propylene co- or terpolymer or their blends or blends with homo-PP or PE | 0.5-4.5 μm |

In this embodiment, this inner intermediate layer is the particle containing layer. If used as in-mold label film in blow molding or injection molding, the inner side having the intermediate layer will be facing the container wall and comes with a sealable inner layer (skin layer) to protect the particle containing layer and promote adhesion between container and label. Besides better particle anchorage, the sealable covering layer improves label bond strength by providing more sealable contact area.

In certain embodiments, for example, in a 5-layer film structure, the particle containing layer may be an intermediate layer:

| Protective/sealant inner skin | Sealant (preferred PE/PP sealant) | 0.5-4 μm |
|---|---|---|
| Inner intermediate layer | PP-Copolymer (C2-content ≥ 2%) equipped with protrusion creating particles as described in Examples in Table 1 | 1.5-10 μm |
| Core layer | Core layer-voided or non-voided | |
| Outer intermediate layer | Polypropylene, optionally pigments, additives | 1.5-8 μm |
| Printable outer skin | Printable propylene co- or terpolymer or their blends or blends with homo-PP or PE | 0.5-4.5 μm |

In certain embodiments, labels made of films according to this invention can be used in thermoforming and injection molding and particularly in injection blow molding processes. The labels made of films according to this invention can also be used, with or without being printed, as packaging films that provide a specific, sandpaper like haptic.

It is noted that stabilizers and neutralizing agents in conventional amounts are in most of the cases already added to the Polypropylene Homo-, Co- and Terpolymer by the corresponding raw material supplier and are therefore not specified in particular in below film formulations, though they are a part of the composition of each film below.

Referring to FIGS. 1-4, a prior art heat sealable layer comprises embossed cells 20 and raised ridges 22.

Figure 6:
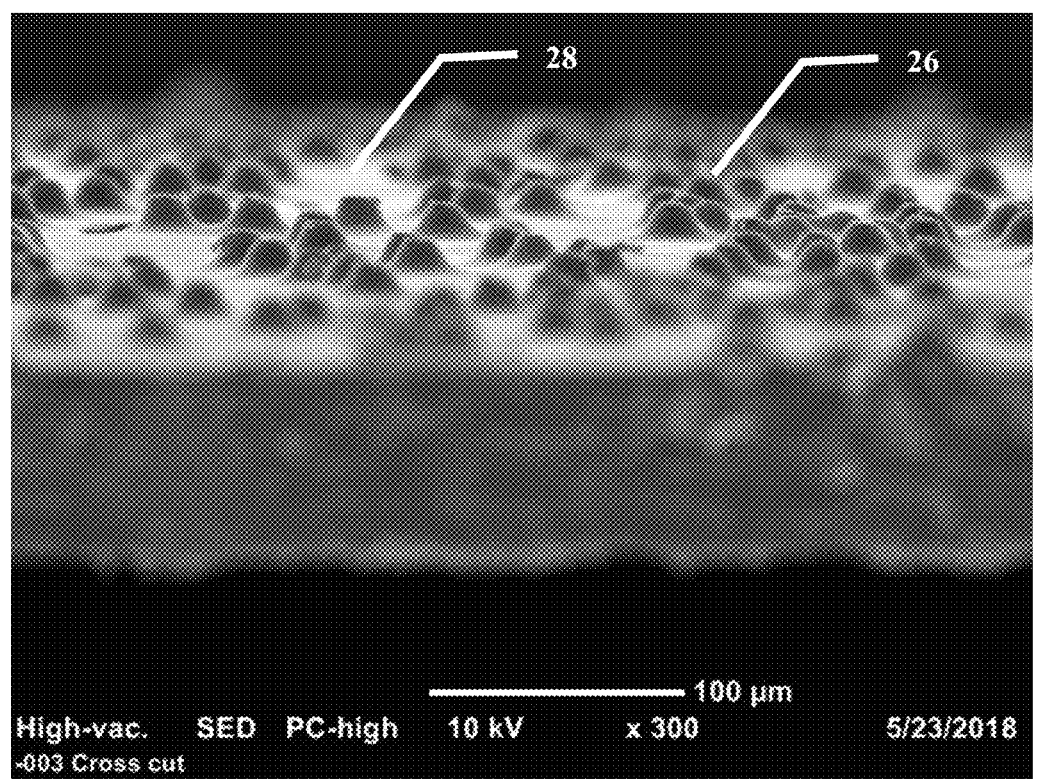
FIG. 6 is a 3D SEM image of an embodiment of a film of the invention.
Figure 7:
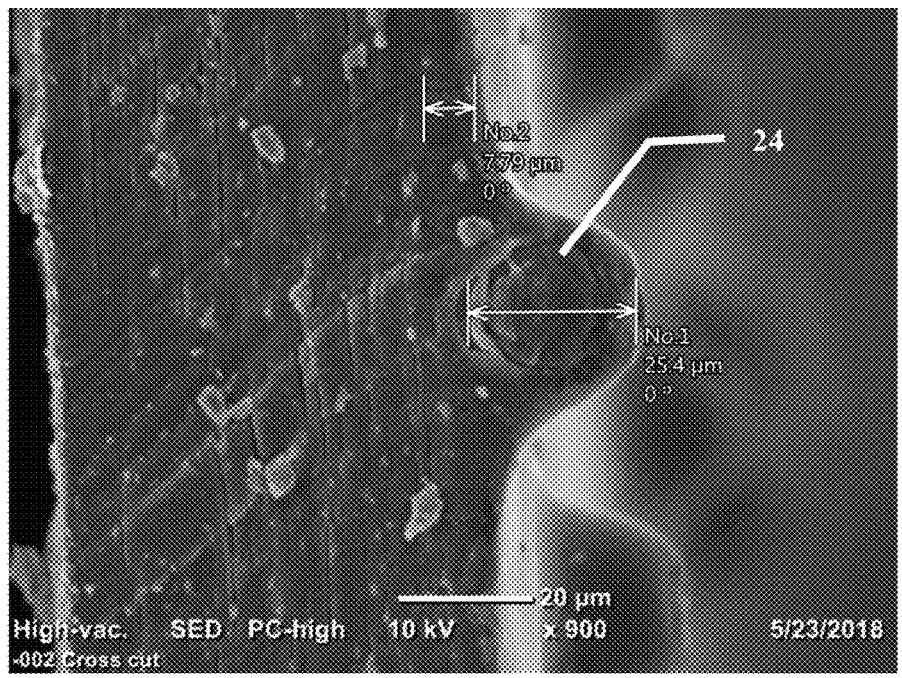
FIG. 7 is a cross cut side view of an embodiment of a film of the invention at 900× magnification.
Figure 8:
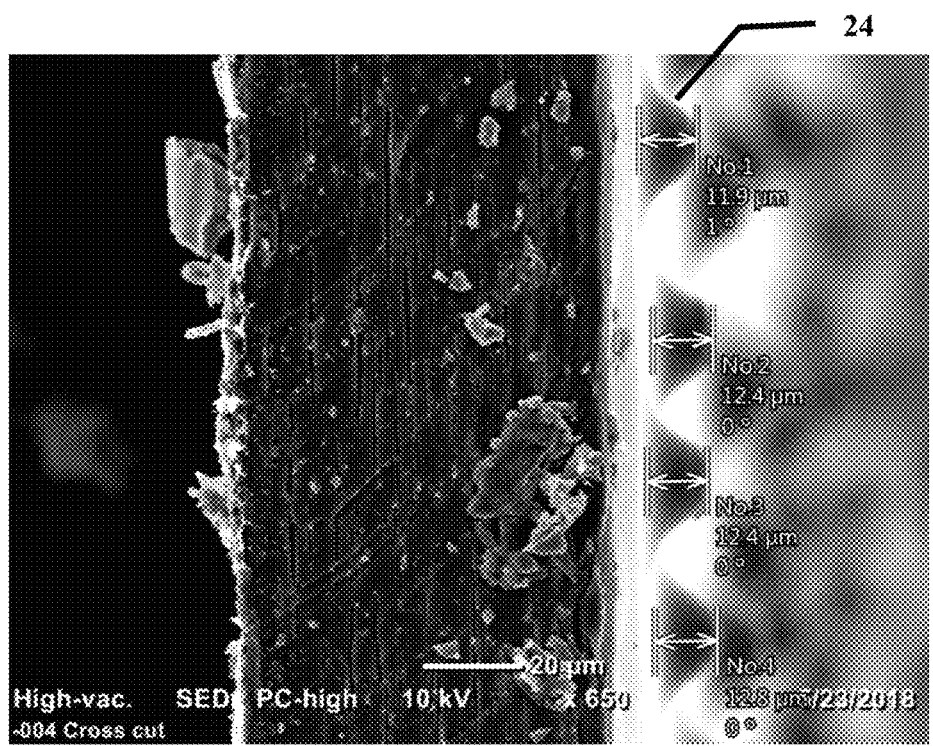
FIG. 8 is a cross cut side view of an embodiment of a film of the invention at 650× magnification.

FIGS. 5-8 show embodiments of a film of the invention, wherein protrusions 26 caused by particles 24 in an intermediate layer protrude from skin layer 30 with channels 28 in the skin layer are provided between particles 24. Particles 24 located in the intermediate layer are large enough to cause a significant surface roughness (i.e., protrusions 26). At the same time, particles are all well anchored (do not penetrate the skin layer). As shown in FIG. 6, particles 24 can be randomly distributed. Larger channels 28 between the clusters are observed, which provides free volume for entrapped gas. FIG. 7 demonstrates particle 24 is well embedded in surface-close areas of the film structure (intermediate layer of sealable side). FIG. 8 shows the height of protrusions 26 is within a fairly narrow range and therefore predictable.

Figure 9:
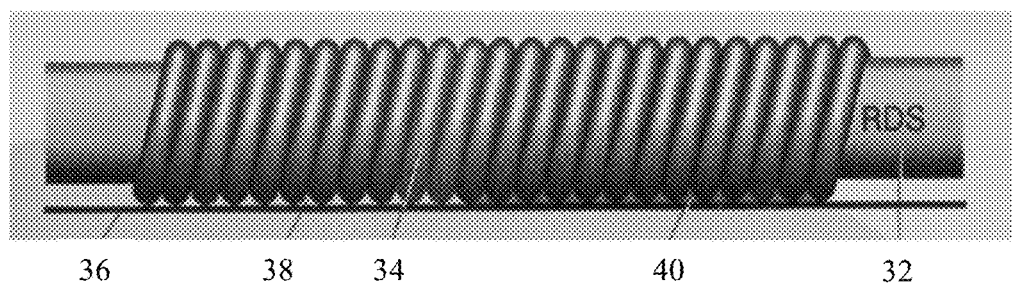
FIG. 9 is a Mayer/wire rod scheme.

FIG. 9 shows a rod 32 on substrate 36 and having wire winding 34 around it coated with coating emulsion 40. Cavities 38 are provided between coils of wire winding 34.

Figure 10:
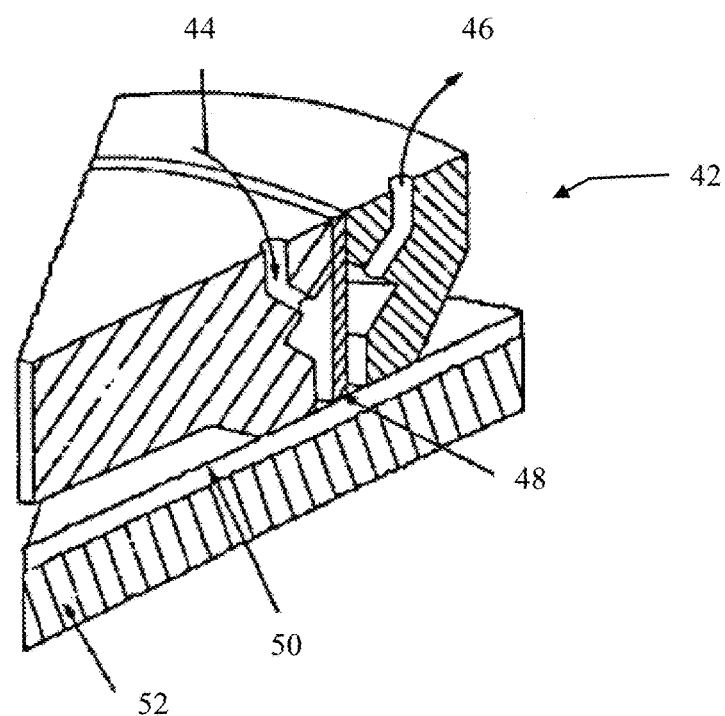
FIG. 10 is a diagrammatic view of a sensing head sectioned on two radii.
Figure 11:
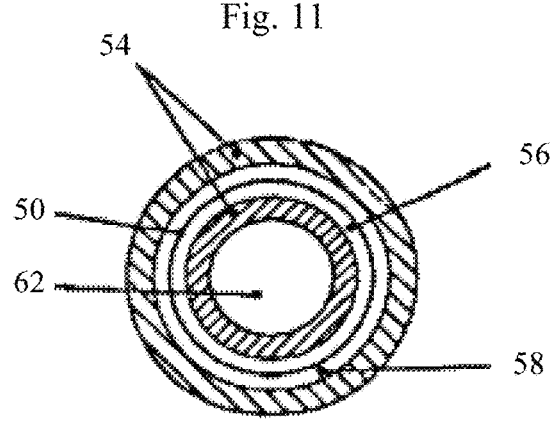
FIG. 11 is a diagrammatic view of a plan of the metering and guard lands of the sensing head.

FIGS. 10-11 show sensing head 42, regulated low pressure air flow 44, air flow to flow meter 46, metering land 48, paper 50, resilient backing 52, guard lands 54, passage connected to air supply 56, passage leading to flowmeters 58 and recess vented to atmosphere 60.

Core or Base Layer

General Description:

The core or base layer represents the majority of the film structure and thickness and therefore defines mechanical stiffness/strength and major physical properties (like density) of the film. In its simplest layout, a core or base layer contains, for example, a Polypropylene Homopolymer with a melt flow index of 2-9 g/10 min (2.16 kg, 230° C.) as major component but can be blended with a Polypropylene based Co- or Terpolymer or C5 or C9 hydrocarbon resins.

If film density is reduced, it may optionally contain a voiding agent, like calcium carbonate ($CaCO_3$) or Polybutylene terephthalate (PBT), or other incompatible filler/particles or polymers that can cause voiding.

Optionally, core or base layer can also serve to provide for migratory slip (such as Erucamide, Stearyl erucamide or Behenamide, . . . ) and/or antistat additives (such as Glyceryl monostearate, ethoxylated amines, . . . ) and/or organic or inorganic pigments (such as $TiO_2$) or blends thereof.

Examples of PP-Homopolymers include Total 3371, Braskem FF03F02, Ineos H03G06 and Exxon Mobil PP4712E1

Examples of PP-Copolymers include Braskem DS6D21, Braskem DS6D82 or Ineos R08G00

Examples of PP-Terpolymers include Lyondell Basell 5C30F, Lyondell Basell 5C39F, Lyondell Basell 6C30F or Braskem DPRG70Q Intermediate Layers General Description:

Layers between core layer and skin layers, that act as functional layers to improve specific film properties like appearance (such as gloss, whiteness, . . . ), or stiffness, or as a bonding layer to improve bonding between core layer and skin layer. In a preferred embodiment the only required intermediate layer is, for example, the particle containing inner intermediate layer that acts as functional layer to increase surface roughness. In the simplest embodiment, no protective skin/covering layer is applied onto the particle containing layer.

Intermediate layers may also serve to provide migratory additives or pigments or other fillers.

Inner Intermediate Layer (or Interlayer)—Sealant Side

In an exemplary preferred embodiment as disclosed herein, the inner intermediate layer may comprise protrusion creating particles. The inner intermediate layer may contain, for example, a PP-Copolymer and/or Terpolymer, or blends of a PP-Copolymer/Terpolymer with Propylene homopolymer as carrier resin for the embedded particles. Besides PP-Copolymer and/or Terpolymer and blends of Copolymer with Propylene Homopolymer, Propylene Homopolymer or even Ethylene Homopolymer can be used as carrier resin. Since there is no other function of the carrier resin than embedding the particles, any polymer that can be combined in a BoPP structure as claimed above, is possible.

Additionally, the inner intermediate layer can contain, for example, migratory slip (such as Erucamide, Stearyl erucamide or Behenamide, . . . ) and/or antistat additives (such as Glyceryl monostearate, ethoxylated amines, . . . ), organic (such as Polybutylene terephthalate (PBT)) or inorganic filler (like $CaCO_3$) and/or pigments ($TiO_2$) or masterbatches thereof and/or C5 or C9 hydrocarbon resins.

The thickness of this layer is 1.5 to 10 µm, preferably 3 to 7 µm.

Examples of PP-Copolymers include Braskem DS6D21, Braskem DS6D82 or Ineos R08G00

Examples of PP-Terpolymers include Lyondell Basell 5C30F, Lyondell Basell 5C39F, Lyondell Basell 6C30F or Braskem DPRG70Q Examples of PP-Homopolymers include Total 3371, Braskem FF03F02, Ineos H03G06 and Exxon Mobil PP4712E1

Examples for PE-Homopolymers include Total M2710EP or Exxon Mobil Exceed 3527 PA.

Outer Intermediate Layer (or Interlayer)—Printable Outer Side:

The outer intermediate layer on the printable side, if applied, may contain, in its simplest layout, a Polypropylene Homopolymer (MFI~2-9 g/10 min) if its function is to improve mechanical properties (stiffness); however if mechanical strength is of less importance, it can also contain, for example, PP-Copolymer and/or Terpolymer, or blends of a PP-Copolymer/Terpolymer with Propylene homopolymer or even only Ethylene homopolymer and blends of Ethylene homopolymer with Propylene homo-, Co-, or Terpolymer.

In certain embodiments, for example, when film appearance needs to be improved, the outer intermediate layer can contain organic (such as Polybutylene terephthalate (PBT)) or inorganic filler (such as $CaCO_3$) and/or pigments ($TiO_2$) or masterbatches thereof. Finally, the outer intermediate layer can serve to supply migratory slip (such as Erucamide, Stearyl erucamide or Behenamide, . . . ) and/or antistat additives (such as Glyceryl monostearate, ethoxylated amines, . . . ) and/or C5 or C9 hydrocarbon resins.

The thickness of this layer is, for example, 1.5 to 8 µm, preferably 2.5 to 6 µm.

Examples of PP-Copolymers include Braskem DS6D21, Braskem DS6D82 or Ineos R08G00

Examples of PP-Terpolymers include Lyondell Basell 5C30F, Lyondell Basell 5C39F, Lyondell Basell 6C30F or Braskem DPRG70Q Examples of PP-Homopolymers include Total 3371, Braskem FF03F02, Ineos H03G06 and Exxon Mobil PP4712E1

Examples of PE-Homopolymers include Total M2710EP or Exxon Mobil Exceed 3527 PA.

Skin or Covering Layer Layers

General Description:

Covering layers on both sides of the film which can be of identical or different composition, and may define or contribute to surface related characteristics like coefficient of friction, sealability, printability, adhesion, readiness to fusion with the container material. Skin layers can contain, for example, inorganic or organic antiblock, migratory or permanent antistats, migratory or non-migratory slip additive, antiblock, filler or pigments and, in the basic embodiment, protrusion generating particles. In a preferred embodiment of the present invention, inner skin layer acts as protective layer to fully embed or encapsulate and anchor particles.

Inner Protective/Sealant Layer (Optional)

In general, the protective sealant layer may require a polymer selected to seal/fuse to/with either PE or PP or both in a temperature range of 75-150° C. in the blow molding or thermoforming process. In a preferred embodiment, a Polypropylene based Copolymer that provides seal ability to both PE and PP may be used; however any other sealable polymers or polymer compositions that fulfills above characteristics can be used. Besides achieving sufficient protrusion of the particles, there is no restriction with regards to thickness of the protective/sealant layer.

Some examples of sealable Polypropylene based polymers include, for example, Dow Intune D5535, Lyondell Basell 5C30F, Lyondell Basell 5C39F, Braskem DS6D21 or Ineos R08G00 or PP/PE blends like Lyondell Basell DUL 3636DP20 or Tosaf MT0523DP.

In addition, the protective sealant layer can contain amounts of organic (such as Polymethyl methacrylate (PMMA), Polymethylsilsesquioxane) or inorganic antiblock particles (like precipitated Silica), migratory or non-migratory slip (such as Polydimethylsiloxane, Erucamide, Stearyl erucamide, Behenamide, . . . ) and/or antistat additives (like Polyethylene oxide (PEO) or Polyethylenimine (PEI) Copolymers, ethoxylated amines, Glyceryl monostearate, . . . ), organic (such as Polybutylene terephthalate (PBT)) or inorganic filler (such as $CaCO_3$) and/or pigments (like $TiO_2$).

The thickness of this layer is preferably 0.5 to 4 µm, more preferably 1 to 3 µm.

Printable Outer Skin Layer

In its simplest layout a printable outer skin may contain Ethylene or Propylene Homo-, Co- or Terpolymer or blends thereof and is optionally surface treated by Corona-, Flame-, or Plasma-treatment.

In addition, the printable skin layer can contain amounts of organic (such as Polymethyl methacrylate (PMMA), Polymethylsilsesquioxane) or inorganic antiblock particles (such as precipitated Silica), migratory or non-migratory slip (such as Polydimethylsiloxane, Erucamide, Stearyl erucamide, Behenamide, . . . ) and/or antistat additives (such as Polyethylene oxide (PEO) or Polyethylenimine (PEI) Copolymers, ethoxylated amines, Glyceryl monostearate, . . . ), organic (such as Polybutylene terephthalate (PBT)) or inorganic filler (such as $CaCO_3$) and/or pigments (such as $TiO_2$).

The thickness of this layer is, for example, 0.5 to 4.5 µm, preferably 1 to 3.5 µm.

Examples of PP-Copolymers include Braskem DS6D21, Braskem DS6D82 or Ineos R08G00

Examples of PP-Terpolymers include Lyondell Basell 5C30F, Lyondell Basell 5C39F, Lyondell Basell 6C30F or Braskem DPRG70Q Examples of PP-Homopolymers include Total 3371, Braskem FF03F02, Ineos H03G06 and Exxon Mobil PP4712E1

Examples for PE-Homopolymers include Total M2710EP or Exxon Mobil Exceed 3527 PA Coefficient of Roughness Disclosed herein is, for example, a multilayer film comprising 3 to 6 layers characterized in that at least one film face comes with an increased surface roughness achieved by protrusion creating particles located in either the inner skin layer or the layer underneath, e.g., the inner intermediate layer. In certain embodiments as disclosed herein, the inner film face has an increased surface roughness achieved by protrusion creating particles located in either the inner skin layer or the layer underneath, e.g., the inner intermediate layer. The so created surface roughness is firstly characterized by average protrusion height of the particles on the surface and concentration of the particles in the appropriate layer which both are combined in the coefficient of roughness, and secondly by Parker Print Surf roughness. To assure a sufficiently developed texture and roughness of the surface of the inner film surface, the coefficient of roughness (CR) is preferably at least ≥0.02, preferably ≥0.05, most preferably ≥0.1. In certain embodiments, the CR is, for example, about 0.01, 0.02, 0.03, 0.04, 0.05, 0.06, 0.07, 0.08, 0.09, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, or 0.6. In certain embodiments, the inner film surface has a CR of about 0.05 to about 0.5. In certain embodiments, the inner film surface has a CR of about 0.10 to about 0.3. In certain embodiments, the inner film surface has a CR of about 0.15 to about 0.2.

In certain embodiments, the inner film surface has a Parker Print Surf roughness of preferably at least 2 µm. In certain embodiments, the Parker Print Surf roughness is about, for example, 1 µm, 1.5 µm, 2 µm, 2.5 µm, 3 µm, 3.5 µm, 4 µm, 5 µm, 6 µm, 7 µm, 8 µm, 9 µm, 10 µm, 11 µm, 12 µm, 13 µm, 14 µm, or 15 µm. In certain embodiments, the Parker Print Surf roughness is at least about 2 µm to at least about 12 µm. In certain embodiments, the Parker Print Surf roughness is at least about 5 µm to at least about 11 µm. In certain embodiments, the Parker Print Surf roughness is at least about 8 µm to at least about 10 µm.

CR is defined as:

$$CR = \frac{1}{1000} * (d_P - (t_C + t_P)) \times \sqrt{N_P}$$

with the values taken for:

$d_P$: Particle diameter (µm)

$t_C$: inner skin layer thickness (µm) that optionally covers the protrusion generating particles $t_P$: the thickness of the layer (µm) that comprises the protrusion generating particles, in preferred embodiments the inner intermediate layer $N_P$: Number of particles per $mm^2$ Determination of average amount of particles $N_P$ per mm2 by microscopic analysis: Micrographs for particle counting were captured with a light microscope of Zeiss, model Axioskop equipped with a camera AxioCam ICc 1 using evaluation software AxioVision SE64. All micrographs were recorded with incident light (50W halogen lamp) and supported by differential interference contrast mode for better visualization of the surface morphology and differentiation of the particles.

Magnification should be chosen such that the counting field of view contains at least 10 particles and for convenience less than about 100 particles. The area of the counting field should be measured. Based on the area of the counting field and the number of particles counted, the number of particles Np per mm2 can be calculated.

Particle containing layer can be applied by Coextrusion, Extrusion coating or water/solvent based coating.

In certain embodiments, the particle containing layer is preferably but not necessarily covered by a second, protective inner layer (skin layer). If a protective inner layer is NOT applied, particle containing layer becomes the inner skin layer. A protective inner layer can be applied by either Coextrusion, Extrusion coating, or water/solvent based coating.

The main function of the protective layer is to improve particle anchorage. Sufficient particle anchorage can also be achieved by an increased thickness (at least 40%, preferably up to half of the weight average particle diameter) of the particle containing layer. Preferred are such particles which have a narrow particle size distribution expressed by coefficient of variation from average particle size of ±50%, more preferred a particle size distribution with a coefficient of variation from the average particle diameter of ±30%.

In another embodiment the film according to this invention is a laminate that comprises a film according to any of the other embodiments as an inner member and another plastic film, preferably a BoPP film, more preferably a transparent BoPP film as an outer member. Outer and inner member may be laminated against each other using a water or solvent based adhesive or by extrusion lamination. In some embodiments printed indicia may be applied between the transparent outer and the inner member, either in direct print on the outer surface of the inner member or in reverse print on the inner surface of the outer member before the lamination step. In other embodiments printed indicia are applied to the outer surface of the outer member.

In other embodiments additional coatings that enhance the printability may be applied to the outer skin layer. Such printability enhancing coatings may be applied in one or two or more layers and comprise resins from a group comprising polyethylene imine, PUs, acrylics, in a thickness of 0.15 to 4 each, preferably 0.2 to 2 μm each.

Film thickness may be between 15-160 μm, preferably 30-130, most preferably 45-110 μm.

Film having a high surface roughness achieved as described above can be used, for example, as an in-mold label with the inner surface of the label in contact with/sealing against/fused with the outside of the container wall.

The invention will be illustrated in more detail with reference to the following Examples, but it should be understood that the present invention is not deemed to be limited thereto.

EXAMPLES

A. Coextruded Examples

A preferred embodiment is 5-layer biaxially oriented polypropylene film having a structure as shown below was chosen to test the invention as label film in in-mold labelling. In one example (Example 1 of Table 1) no protective sealant skin layer was applied.

The Examples were obtained by multilayer coextrusion at a melt temperature of about 250° C., cooled on 2 chill rolls at 30° C., and subsequently orientation in a Tenter process with a ratio of approx. 5:1 in MD at 126 C and approx. 9:1 in TD at 155° C.

| Protective/sealant inner skin | Dow Intune D5535 | 0.5-4 μm |
| Inner intermediate layer | Modifications-see Table 1 | 1.5-10 μm |
| Core layer | 87% Braskem FF03F02 + 13% Schulman/Lyondell Basell PF97N | |
| Outer intermediate layer | 90% Braskem FF03F02 + 10% Schulman/Lyondell Basell P8266 | 1.5-8 μm |
| Printable outer skin | Modifications-see Table 1 | 0.5-4.5 μm |

The structure was modified in different embodiments according to the invention as listed in Table 1:

TABLE 1

| ID | Carrier resin in inner intermediate layer | Grade names carrier resin blend | PMMA Particle Concentration [wt %] | Mean particle size $d_P$ [μm] | Inner Inter layer thickness $t_C$ [μm] | protective inner skin thickness $t_P$ [μm] | Particles $N_P$ per mm² found | Outer printable skin composition |
|---|---|---|---|---|---|---|---|---|
| Ex 1 | Olefin-Block-Copolymer | 80% Dow Intune D5535 | 20 | 10 | 6 | NA (skin layer not applied) | 1800 | Copo |
| Ex 2 | 20% PP-Copolymer + 60% Homo-PP | 20% Braskem DS6D21 + 60% Braskem FF03F02 | 20 | 10 | 4 | 1.5 | 1220 | 50% Copo 40% Homo-PP + 10% CaCO₃ MB |
| Ex 3 | 37.5% PP-Copolymer + 37.5% Homo-PP | 37.5% Braskem DS6D21 + 37.5% Braskem FF03F02 | 25 | 10 | 4 | 2 | 1500 | 90% Copo + 10% CaCO₃ MB |
| Ex 4 | 85% PP-Copolymer | 85% Braskem DS6D21 | 15 | 20 | 4 | 2 | 124 | Copo |
| Ex 5 | 75% PP-Copolymer | 75% Braskem DS6D21 | 25 | 20 | 4 | 2 | 196 | PE/PP matt blend |
| Ex 6 | 85% PP-Copolymer | 85% Braskem DS6D21 | 15 | 30 | 5 | 3 | 49 | Copo |
| Ex 7 | 80% PP-Copolymer | 80% Braskem DS6D21 | 20 | 30 | 5 | 3.5 | 54 | Terpo |

Example calculation for Coefficient of roughness using data provided in Table 1, Example 2:

$$CR = 1/1000 * (d_P - (t_C + t_P)) \times \sqrt{N_P}$$

$$CR = 1/1000 * (10 - (1.5 + 4.0)) \times \sqrt{1220}$$

$$CR = 1/1000 * 4.5 \times 34.9$$

$$CR = 4.5 \times 0.0349$$

$$CR = 0.157$$

Example 1

Composition:

| | | |
|---|---|---|
| Outer skin layer | Thickness: 1.0 μm | 100% Braskem DS6D21 |
| Outer intermediate layer | Thickness: 6.0 μm | 90% Braskem FF03F02 + 10% Lyondell Basell P8266 |
| Core layer | Thickness: 92.0 μm | 87% Braskem FF03F02 + 13% Schulman/Lyondell Basell PF97N |
| Inner intermediate layer | Thickness: 6.0 μm | 80% Dow Intune 5535 + 20% Microbeads Spheromers CA10 |
| Inner skin layer | Thickness: 0.0 μm | NA |

All layers of the film additionally contained stabilizer and neutralizing agent in conventional amounts.
Outer skin layer is surface treated by corona discharge.
The film had an average density of 0.65 g/cm³ with an overall thickness of 105 μm.

Example 2

Composition:

| | | |
|---|---|---|
| Outer skin layer | Thickness: 2.0 μm | 50% Braskem DS6D21 + 36% Braskem FF03F02 + 14% Schulman/Lyondell Basell PF97N |
| Outer intermediate layer | Thickness: 6.0 μm | 90% Braskem FF03F02 + 10% Lyondell Basell P8266 |
| Core layer | Thickness: 91.5 μm | 87% Braskem FF03F02 + 13% Schulman/Lyondell Basell PF97N |
| Inner intermediate layer | Thickness: 4.0 μm | 20% Braskem DS6D21 + 60% Braskem FF03F02 + 20% Microbeads Spheromers CA10 |
| Inner skin layer | Thickness: 1.5 μm | 100% Dow Intune 5535 |

All layers of the film additionally contained stabilizer and neutralizing agent in conventional amounts.
Outer skin layer is surface treated by corona discharge.
The film had an average density of 0.65 g/cm³ with an overall thickness of 105 μm.

Example 3

Composition:

| | | |
|---|---|---|
| Outer skin layer | Thickness: 2.0 μm | 86% Braskem DS6D21 + 14% Schulman/Lyondell Basell PF97N |
| Outer intermediate layer | Thickness: 6.0 μm | 90% Braskem FF03F02 + 10% Lyondell Basell P8266 |
| Core layer | Thickness: 91.0 μm | 87% Braskem FF03F02 +13% Schulman/Lyondell Basell PF97N |
| Inner intermediate layer | Thickness: 4.0 μm | 37.5% Braskem DS6D21 + 37.5% Braskem FF03F02 + 25% Microbeads Spheromers CA10 |
| Inner skin layer | Thickness: 2.0 μm | 100% Dow Intune 5535 |

All layers of the film additionally contained stabilizer and neutralizing agent in conventional amounts.
Outer skin layer is surface treated by corona discharge.
The film had an average density of 0.66 g/cm³ with an overall thickness of 105 μm.

Example 4

Composition:

| | | |
|---|---|---|
| Outer skin layer | Thickness: 1.0 μm | 100% Braskem DS6D21 |
| Outer intermediate layer | Thickness: 6.0 μm | 90% Braskem FF03F02 + 10% Lyondell Basell P8266 |
| Core layer | Thickness: 92.0 μm | 87% Braskem FF03F02 + 13% Schulman/Lyondell Basell PF97N |
| Inner intermediate layer | Thickness: 4.0 μm | 85% Braskem DS6D21 + 15% Microbeads Spheromers CA20 |
| Inner skin layer | Thickness: 2.0 μm | 100% Dow Intune 5535 |

All layers of the film additionally contained stabilizer and neutralizing agent in conventional amounts.
Outer skin layer is surface treated by corona discharge.
The film had an average density of 0.65 g/cm³ with an overall thickness of 105 μm.

Example 5

Composition:

| | | |
|---|---|---|
| Outer skin layer | Thickness: 2.5 μm | 100% Tosaf MT0523DP |
| Outer intermediate layer | Thickness: 6.0 μm | 90% Braskem FF03F02 + 10% Lyondell Basell P8266 |
| Core layer | Thickness: 90.5 μm | 87% Braskem FF03F02 + 13% Schulman/Lyondell Basell PF97N |
| Inner intermediate layer | Thickness: 4.0 μm | 75% Braskem DS6D21 + 25% Microbeads Spheromers CA20 |
| Inner skin layer | Thickness: 2.0 μm | 100% Dow Intune 5535 |

All layers of the film additionally contained stabilizer and neutralizing agent in conventional amounts.
Outer skin layer is surface treated by corona discharge.
The film had an average density of 0.66 g/cm³ with an overall thickness of 105 μm.

Example 6

Composition:

| | | |
|---|---|---|
| Outer skin layer | Thickness: 1.0 μm | 100% Braskem DS6D21 |
| Outer intermediate layer | Thickness: 6.0 μm | 90% Braskem FF03F02 + 10% Lyondell Basell P8266 |
| Core layer | Thickness: 90.0 μm | 87% Braskem FF03F02 + 13% Schulman/Lyondell Basell PF97N |
| Inner intermediate layer | Thickness: 5.0 μm | 85% Braskem DS6D21 + 15% Microbeads Spheromers CA30 |
| Inner skin layer | Thickness: 3.0 μm | 100% Dow Intune 5535 |

All layers of the film additionally contained stabilizer and neutralizing agent in conventional amounts.
Outer skin layer is surface treated by corona discharge.
The film had an average density of 0.67 g/cm³ with an overall thickness of 105 μm.

Example 7

Composition:

| | | |
|---|---|---|
| Outer skin layer | Thickness: 1.0 µm | 100% Lyondell Basell Adsyl 5C30F |
| Outer intermediate layer | Thickness: 6.0 µm | 90% Braskem FF03F02 + 10% Lyondell Basell P8266 |
| Core layer | Thickness: 89.5 µm | 87% Braskem FF03F02 + 13% Schulman/Lyondell Basell PF97N |
| Inner intermediate layer | Thickness: 5.0 µm | 80% Braskem DS6D21 + 20% Microbeads Spheromers CA30 |
| Inner skin layer | Thickness: 3.5 µm | 100% Dow Intune 5535 |

All layers of the film additionally contained stabilizer and neutralizing agent in conventional amounts.

Outer skin layer is surface treated by corona discharge.

The film had an average density of 0.67 g/cm$^3$ with an overall thickness of 105 µm.

Alternative Raw Material Grades

PP-Homopolymers (MFI~3 g/10 min): as alternative to Braskem FF03F02

Total 3371, Ineos H03G06, Exxon Mobil PP4712E1

PP-Homopolymers (MFI~8-9 g/10 min): as alternative to Braskem FF03F02

Total 3571, Braskem PG80Q, Braskem DPRG70Q

High crystalline PP-Homopolymers: as alternative to Braskem FF03F02

Phillips CH020XKX, Braskem 6025

PP-Copolymers: as alternative to Braskem DS6D21

Braskem DS6D82, Ineos R08G00

PP-Terpolymers: as alternative to Lyondell Basell Adsyl 5C30F

Lyondell Basell Adsyl 5C39F, Lyondell Basell Adsyl 6C30F, Lyondell Basell Adsyl 3C30F, Braskem DPRG70Q, Total 6575

PE/PP matt blends: as alternative to Tosaf MT0523DP

Lyondell Basell DUL3636DP20 ANAT, DUL3636LTX-3NAT

PE-Homopolymers: as alternative to ready-made PE/PP matt blends

Total M2710EP or Exxon Mobil Exceed 3527 PA

Voiding agents: as alternative to Schulman/Lyondell Basell PF97N

Schulman/Lyondell Basell PF97, Ampacet Pearl 70

B. Coated Examples

In another embodiment, PMMA particles of various mean particle sizes have been suspended in a waterborne Polyurethane dispersion (Compositions shown below). The polyurethane dispersions have been procured by DSM under the name of R600 and R620 and have been used as delivered but blended to equal parts (50/50).

3-Layer Film Structure Showing the Invented Layer Composition as Skin Layer:

| | | |
|---|---|---|
| Coating | i.e., water borne Polyurethane coating doped with protrusion generating particles | 4 to 15 g/sqm |
| Coating support inner skin | Sealable PP-Copolymer | 0.5-4 µm |
| Core layer | Core layer-voided or non-voided | |
| Printable outer skin | Printable propylene co- or terpolymer or their blends or blends with homo-PP or PE | 0.5-4.5 µm |

Further embodiments comprise additional interlayers inserted between the core and one or both of the skin layers and/or additional coatings on the outer surface of the outer skin layer to i.e. enhance printability are shown in Table 2. Such printability enhancing coatings are applied in one or two or more layers and comprise resins from a group comprising polyethylene imine, PUs, acrylics, in a thickness of 0.15 to 4 each, preferably 0.2 to 2 µm each.

TABLE 2

Composition of PU dispersion for waterborne coating application:

| Indication | Mean particle size [µm] | Particle concentration [wt %] | PU dispersion [wt %] in water | Mayer rod # | Coat weight dry [g/m$^2$] | Particles per mm$^2$ Found |
|---|---|---|---|---|---|---|
| Example 8 | 10 | 10 | 33 | 24 | 8.9 | 3200 |
| Example 9 | 10 | 20 | 33 | 24 | 9.3 | 5200 |
| Example 10 | 20 | 10 | 33 | 24 | 9.8 | 480 |
| Example 11 | 20 | 20 | 33 | 24 | 10.1 | 800 |
| Example 12 | 30 | 10 | 33 | 30 | 10.2 | 150 |
| Example 13 | 30 | 20 | 33 | 30 | 10.5 | 250 |

The particles have been kept well-suspended in the PU dispersion by fast agitation until before applying the coating. The dispersion was then applied onto a film substrate by Mayer rod coating using Mayer rods as indicated above.

Application Method:

Mayer rod coating creates a uniform coating of a wet film (liquid) by drawdown. The Mayer rod is a metering rod that defines coating thickness by the diameter and the distance of the windings of a wire wound around a cylindrical rod. The amount of liquids is hereby defined by the gap between two windings (see FIG. 9). The smaller the gaps, the less liquid is applied and therefore the lower the coating thickness.

Examples 1-13 have been tested for Parker Print-Surf roughness and scanning electron microcopy. Both methods confirmed the high surface roughness provided by the technique according to the present invention. Example 1-7 (Table 1; coextruded samples) have been additionally tested in IML in blow molding against an established market standard ("Control" in Table 3).

For the application IML in blow molding, surface roughness, especially if evaluated by an air leak roughness method like PPS (Parker Print surf), is a parameter related to free gas flow which has been found to correlated well to stow away entrapped air between label surface and container, thus to the ability to avoid blister formation. U.S. Pat. No. 5,254,302 characterizes the surface roughness by so-called Bekk's surface smoothness (5, line 57-63). Bekk's surface smoothness is similar to Parker Print-Surf roughness an air leak roughness measurement developed for paper; however, it is an older method, more commonly used in Europe.

Parker Print-Surf roughness is an air leak roughness measurement, invented to determine the roughness of paper and paperboard. It is defined in TAPPI standard T 555. The measuring principle is to determine the resistance of flow of air in the gap left open when pressing the test surface against a hard and smooth metal platform. Based on the air flow rate a mean gap Ra in µm is calculated. Results are summarized in Table 3, below.

The appearance of the label applied to the container was determined by visual inspection, 1 marking no blister, no crease, 2 marking few small blisters or creases, 3 marking number or size of blisters or creases regarded prohibitive for commercial use.

Label bond strength was measured with a tensile tester, MTS Systems Corp. Model QT/5.

Description of Label Bond Strength Test:

Label bond strength on the IM labelled blow mold containers was determined a tensile tester, MTS Systems Corp. Model QT/5. For the test, the lower clamp was replaced for a "sliding table". A piece of container wall decorated with the label was horizontally fixed onto the table, a stripe of 25.4 mm was scored in the label area and the peel-off of this stripe was initiated by hand until the length of the peeled area was sufficient to be fixed in the upper clamp. Peel-off propagation force was measured (=Label bond strength) under an angle of 90°.

TABLE 3

Results for PPS roughness, Label defects and bond strength; 1 = no blister, no crease, 2 + few small blisters or creases, 3 = number or size of blisters or creases regarded prohibitive for commercial use. Example 1-6 extruded, Example 7-12 coated

| Identification | Mean particle size [μm] | Concentration [wt %] | Coefficient of roughness CR for particles found | Parker Print-Surf roughness [μm] | Label defect code | Label bond strength [g/25.4 mm] |
|---|---|---|---|---|---|---|
| Control | NA | NA | NA | 6.5 | 1 | 1,100 |
| Example 1 | 10 | 20 | 0.170 | 2.4 | 2 | 1,280 |
| Example 2 | 10 | 20 | 0.157 | 2.2 | 2 | 1,340 |
| Example 3 | 10 | 25 | 0.155 | 3.0 | 2 | NR* |
| Example 4 | 20 | 15 | 0.156 | 8.9 | 1 | 1,200 |
| Example 5 | 20 | 25 | 0.196 | 9.6 | 1 | 330 |
| Example 6 | 30 | 15 | 0.154 | 11.5 | 1 | 550 |
| Example 7 | 30 | 20 | 0.158 | 10.5 | 1 | 250 |
| Example 8 | 10 | 10 | 0.160 | 5.6 | NA | NA |
| Example 9 | 10 | 20 | 0.175 | 7.2 | NA | NA |
| Example 10 | 20 | 10 | 0.265 | 6.2 | NA | NA |
| Example 11 | 20 | 20 | 0.333 | 9.3 | NA | NA |
| Example 12 | 30 | 10 | 0.267 | 10.1 | NA | NA |
| Example 13 | 30 | 20 | 0.339 | 9.6 | NA | NA |

Remark:
* = No result (NR), peel-off could not be initiated, label was entirely merged with the container

TABLE 4

Standard "rough", commercially available film types, not using technology of this invention

| Identification/film grade | Mean particle size [μm] | Concentration [wt %] | Parker Print-Surf roughness [μm] |
|---|---|---|---|
| LIM60 | NA | NA | 1.16 |
| 400WTLII | <1 | 10 | 0.44 |
| 400WTLII | 3 | 15 | 0.42 |
| LMW38 | 5 | 2 | 0.60 |

Parker Print Surf: (Text from TAPPI Standard T 555 pm-94)

Apparatus:

5.1 Air supply. A source of clean air, free of oil and water droplets, at a steady pressure within the range 300 kPa (43 lb/in) to 600 kPa (86 lb/in). If the instrument 2 2 is not provided with internal air filters the provision of an external oil mist filter having an effective screening efficiency of 99.99% at 0.5 mm particle size is recommended.

5.2 Sensing head. A circular head of the form shown in FIGS. 1 and 2 of TAPPI standard T 555 pm-94, consisting of three steel lands which have coplanar, polished surfaces. The center or measuring land shall be 51.0 μm±1.5 μm wide and have an effective length of 98.0±0.5 mm. The two guard lands shall each be at least 1000 μm wide at any point and the radial distance between them at any point shall be 152 μm±10 μm. The measuring land shall be centered between them to within ±10 μm. The lands shall be fixed in an airtight mounting constructed so that air can be passed into the gap between the inner guard land and the measuring land and exhausted from the gap between the measuring land and the outer guard land. A spring-loaded protective collar shall be fitted outside the guard lands. The measuring head should be readily detachable for cleaning and so should be constructed in such a way that an airtight seal between the head and the air inlet and outlet ports may be easily formed and maintained. In most commercially available instruments, the back of the head is ground and lapped to mate with an air manifold.

5.3 Sensing head air pressure regulator. The sensing head shall be supplied with air regulated at a known differential pressure. In instruments employing variable area flowmeters and following the original Parker design the differential pressure across the measuring land and flowmeters is specified as 6.2±0.1 kPa or 19.6±0.1 kPa. Later instruments employing electronic flow measurement techniques may require different differential pressure settings and tolerances.

5.4 Resilient backings. Two types of resilient backings are normally available for use in pressing the test piece against the sensing head. The backings are in the form of disks, at least 10 μm greater in diameter than the outside diameter of the guard land.

5.4.1 Soft backing. Consisting of a rubber offset printing blanket composed of a layer of synthetic rubber at least 600 μm thick, bonded to a fabric backing giving an overall thickness of at least 2000 μm±200 μm. The apparent hardness of the complete backing is 83±6 IRHD (international rubber hardness degrees).

5.4.2 Hard backing. A composite consisting of a layer of polyester film bonded at its periphery to cork, offset blanket or similar material. There is a small exhaust hole in the centre of the polyester disk to prevent the entrapment of air between the disk and the cork. The apparent hardness of the assembly is 95±2 IRHD.

5.5 Backing holders. Rigid metal disks, each recessed to accommodate a resilient backing disk. The backing is secured evenly in the holder over its entire surface area by some suitable means, for example double sided adhesive tape.

5.6 Clamping mechanism, allowing clamping of the test piece between the backing and the sensing head during the measurement cycle. The clamping system should allow the selection of either of the following three clamping pressures; 490±30 kPa, 980±30 kPa or 1960±30 kPa. The clamping pressure is calculated from the total area of the measuring and guard lands. The construction of the clamping mechanism should be such that, when activated, the system reaches 90% of its final value in approximately 0.4 s and 99% of its final value in approximately 0.8 s.

5.7 Measuring system. Any measuring system may be employed which is able to measure the flow of air between the measuring land and the clamped test piece, convert it to the "cube root mean cube gap" in accordance with Appendix A.1 and display the roughness value in micrometers. Examples of measuring systems which have been successfully employed in commercial instruments include:

5.7.1 Variable area flowmeter instruments. Air leaking between the measuring land and the test piece is collected and passed through a variable area flowmeter calibrated to read directly in micrometers roughness. The range of such instruments is normally 0.9-6.0 mm and a number of variable area flowmeters, usually four, may be necessary to cover the range. In the one known commercial instrument of this type the flowmeters are calibrated at a differential pressure of 6.2±0.1 kPa and the pressure across the sensing head must be maintained at this value throughout the test by the measuring air regulator.

5.7.2 Impedance type instruments. The design and construction of the Print-surf measuring head is such that the relationship between differential pressure and airflow, after correcting for compressibility of air, is substantially linear below some limiting value of differential pressure. It is therefore possible to calculate the airflow through the head by comparing the pressure drop across the head with that across a known fluidic impedance connected in series with it. The differential pressures can be readily measured with suitable transducers and the value of the reference internal fluidic impedance determined during manufacture. The roughness of the test piece may be calculated from the transducer outputs and the impedance value. One advantage of this type of measuring system is that it is largely independent of measuring air pressure below a certain limiting value. The measuring system shall make the measurements necessary to calculate roughness of the test piece 4.5±0.5 s after the application of the clamping force.

While the invention has been described in detail and with reference to specific examples thereof, it will be apparent to one skilled in the art that various changes and modifications can be made therein without departing from the spirit and scope thereof.

What is claimed is:

1. A multilayer film having an inner film face and an outer film face, the film comprising:
   an inner skin layer;
   an outer skin layer which is optionally a printable layer;
   a core layer between the inner skin layer and the outer skin layer, wherein the core layer has a thickness which is a majority of a thickness of the multilayer film structure, and is optionally voided;
   an inner intermediate layer interposed between the inner skin layer and the core layer; and
   protrusion creating particles in the inner intermediate layer and configured to provide protrusions on the inner film face, said protrusion creating particles having a size of from 8 micrometers to 60 micrometers and a narrow particle size distribution expressed by a coefficient of variation from an average particle size of ±50%,
   wherein said inner film face has a surface roughness characterized by a coefficient of roughness (CR) of ≥0.02 or a Parker Print Surf roughness of at least 2 μm.

2. The multilayer film of claim 1, wherein the CR of the inner film face is 0.05 to 0.5.

3. The multilayer film of claim 1, wherein the Parker Print Surf roughness of the inner film face is 2 μm to 12 μm.

4. The multilayer film of claim 1, wherein said protrusion creating particles comprise a material selected from the group consisting of Poly(Methyl Methacrylate) (PMMA), Polymethylsilsesquioxane, Silica, Polystyrene, Polybutylene terephthalate, $CaCO_3$, $TiO_2$, Talc, Mica, Vermiculite and combinations thereof.

5. The multilayer film of claim 1, wherein a layer containing the protrusion creating particle has a thickness of up to 50% of an average particle diameter.

6. The multilayer film of claim 1, wherein said protrusion creating particles are essentially spherical.

7. The multilayer film of claim 1, wherein the inner skin layer has a protective sealant layer optionally comprising at least one of organic antiblock particles, inorganic antiblock particles, migratory slip additives, non-migratory slip additives, migratory antistat addivites, non-migratory antistat additives, organic filler, inorganic filler, organic pigments, non-organic and pigments, and wherein a thickness of said protective sealant layer is 0.5 to 4 μm.

8. The multilayer film of claim 1, wherein the inner skin layer has a protective sealant layer wherein the protective sealant layer comprises a polymer selected to seal with polypropylene or polyethylene.

9. The multilayer film of claim 1, wherein the core layer comprises a polypropylene homopolymer, optionally wherein the polypropylene homopolymer is blended with a polypropylene based co- or terpolymer, C5 or C9 hydrocarbon resins, and optionally a voiding agent.

10. The multilayer film of claim 1, wherein the core layer comprises a voiding agent selected from the group consisting of calcium carbonate and polybutylene terephthalate.

11. The multilayer film of claim 1, wherein the inner intermediate layer comprises a coating with the protrusion creating particles embedded therein.

12. The multilayer film of claim 11, wherein said inner intermediate layer has a sealant layer applied thereto, wherein the sealant layer comprises a carrier resin for the protrusion creating particles, and wherein the carrier resin is selected from the group consisting of propylene copolymer, a blend of propylene copolymer with propylene homopolymer, propylene homopolymer, ethylene homopolymer, and combinations thereof.

13. The multilayer film of claim 1, further comprising an outer intermediate layer which is interposed between said core layer and said outer skin layer, wherein said outer intermediate layer improves bonding between the core layer and said outer skin layer.

14. The multilayer film of claim 1, which is a laminate, wherein an outer member and an inner member are laminated against each other using a water or solvent based adhesive or by extrusion lamination.

15. The multilayer film of claim 14, wherein printed indicia are applied between the outer member, which is transparent, and the inner member.

16. The multilayer film of claim 15, wherein the printed indicia are applied: (a) in direct print on an outer surface of the inner member or (b) in reverse print on an inner surface of the outer member.

17. The multilayer film of claim 1, wherein the outer skin layer is a transparent BoPP layer.

18. The multilayer film of claim 1, wherein printed indicia are applied to an outer surface of the outer skin layer, which comprises a printable layer, wherein the printable layer comprises at least one member selected from the group consisting of ethylene homopolymer, propylene homopolymer, ethylene copolymer, propylene copolymer, ethylene terpolymer, propylene terpolymer, organic antiblock particles, inorganic antiblock particles, migratory slip additives, non-migratory slip additives, migratory antistat additives, non-migratory antistat additives, organic filler, inorganic filler, organic pigments and inorganic pigments, and further wherein a thickness of the layer is 0.5 to 4.5 µm.

19. The multilayer film of claim 1, wherein the outer skin layer comprises printability enhancing coatings applied in one or more layers and comprising resins selected from the group consisting of polyethylene imine, polyurethanes, acrylics, and combinations thereof.

20. The multilayer film of claim 19, wherein the outer skin layer comprises the printability enhancing coatings in a thickness of 0.15 to 4 µm each.

21. The multilayer film of claim 1, wherein the film thickness is 15-160 µm.

22. The multilayer film of claim 1, configured for use as a label in In-mold labelling.

23. The multilayer film of claim 22, which is effective to provide a label bond strength to a container of at least 200 g/inch.

24. A method of producing the multilayer film of claim 1, said method comprising:
(a) providing the inner skin layer;
(b) providing the inner intermediate layer on the inner skin layer;
(c) providing the core layer on the inner intermediate layer; and
(d) providing the outer skin layer on the core layer.

* * * * *